(12) United States Patent
Fulton, III

(10) Patent No.: US 10,407,635 B2
(45) Date of Patent: *Sep. 10, 2019

(54) FLUIDIZABLE ALGAE-BASED POWDERED FUEL AND METHODS FOR MAKING AND USING SAME

(71) Applicant: Robert Fulton, III, St. George, UT (US)

(72) Inventor: Robert Fulton, III, St. George, UT (US)

(*) Notice: Subject to any disclaimer, the term of this patent is extended or adjusted under 35 U.S.C. 154(b) by 672 days.

This patent is subject to a terminal disclaimer.

(21) Appl. No.: 14/973,418

(22) Filed: Dec. 17, 2015

(65) Prior Publication Data

US 2016/0102263 A1  Apr. 14, 2016

Related U.S. Application Data

(62) Division of application No. 12/765,674, filed on Apr. 22, 2010, now Pat. No. 9,896,636.

(51) Int. Cl.
| | |
|---|---|
| *C10L 5/08* | (2006.01) |
| *C10L 5/40* | (2006.01) |
| *C10L 5/36* | (2006.01) |
| *C10L 5/44* | (2006.01) |
| *F02C 3/20* | (2006.01) |
| *F02C 3/26* | (2006.01) |
| *C02F 11/12* | (2019.01) |

(52) U.S. Cl.
CPC ...... *C10L 5/40* (2013.01); *C10L 5/08* (2013.01); *C10L 5/366* (2013.01); *C10L 5/44* (2013.01); *F02C 3/20* (2013.01); *F02C 3/26* (2013.01); *C02F 11/12* (2013.01); *C10L 2200/0469* (2013.01); *C10L 2250/06* (2013.01); *C10L 2290/06* (2013.01); *C10L 2290/08* (2013.01); *C10L 2290/28* (2013.01); *Y02E 50/10* (2013.01); *Y02E 50/30* (2013.01); *Y02T 50/671* (2013.01); *Y02T 50/678* (2013.01)

(58) Field of Classification Search
CPC .... C10L 5/08; C10L 5/366; C10L 5/44; C10L 2290/08; F02C 3/26
USPC .......................................................... 60/772
See application file for complete search history.

(56) References Cited

U.S. PATENT DOCUMENTS

| | | | | |
|---|---|---|---|---|
| 5,277,245 A | * | 1/1994 | Dutta .................... | B01J 8/1809 165/104.13 |
| 2008/0016843 A1 | * | 1/2008 | Lewis ..................... | C10L 1/02 60/215 |

OTHER PUBLICATIONS

The use of a fuel containing Chlorella vulgaris in a diesel engine, A.H. Scragg et al., Oct. 27, 2003.*

* cited by examiner

*Primary Examiner* — Lindsay M Low
*Assistant Examiner* — Omar Morales
(74) *Attorney, Agent, or Firm* — Gurr Brande & Spendlove; Robert A. Gurr

(57) ABSTRACT

An algae-based powdered fuel is configured to be fluidized in a gas stream. The algae-based powdered fuel is manufactured by drying an algae slurry to produce a powdered composition and then comminuting the powdered composition to produce the fuel. The algae-based powdered fuel can be combusted in a gas turbine to generate electricity and/or to propel an aircraft.

9 Claims, 6 Drawing Sheets

FLUIDIZABLE ALGAE-BASED POWDERED FUEL AND METHODS FOR MAKING AND USING SAME

CROSS-REFERENCE TO RELATED APPLICATIONS

This application is a divisional of U.S. patent application Ser. No. 12/765,674 filed Apr. 22, 2010.

BACKGROUND OF THE INVENTION

1. The Field of the Invention

The present invention relates to solid powder fuels derived from algae and methods for making these fuels and using the fuels to drive a gas turbine.

2. The Related Technology

Renewable resources for energy generation are gaining increasing value as world-wide demand for fossil fuels increases while existing sources are diminished by current consumption rates. Triglycerides form the lipidic energy storage of plant cells and can be extracted from plant biomass to generate an oil product via a solvent extraction or through more complicated processes. Such processes include two-phase extraction of oil from biomass (see e.g., U.S. Pat. No. 6,166,231) and solventless extraction processes (see e.g., U.S. Pat. No. 6,750,048). The resulting oil from these processes is a mixture of triglycerides and various lipophilic pigments, such as carotenoids and xanthophylls. The oil can be used as a fuel, either directly if fed to a burner or an engine, or indirectly if converted to biodiesel via transesterification.

Vegetable oils, derived from plants like soy, canola, sunflower, marigold and palm, can be used as renewable energy resources, usually upon their conversion into biodiesel via transesterification. Oil produced from microorganisms, such as algae, can be used in addition to or as a replacement of vegetable oils. While vegetable oil from plants can be used in the place of some fossil fuels, oil products derived from microorganisms such as algae have the potential to satisfy a higher portion of the global energy demand. Algae can produce 10 to 250 times higher oil yields per acre per year than terrestrial plants. For example, half the entire landmass of the United States would have to be cultivated in soy to produce enough vegetable oil to replace the current US diesel consumption. In contrast, only a fraction of this area would be necessary to cultivate sufficient algae to produce enough oil products to replace current US diesel consumption.

Presently the establishment of systems for the large scale production of oil from plants and microorganisms has not been economically viable. The difficulties in enhancing oil accumulation rates in plants and microorganisms, the development of inexpensive growing systems, and the production of substantially pure forms of oil have made oil produced from organisms more expensive than fossil fuels.

BRIEF SUMMARY

The present invention relates to a fluidizable algae-based powdered fuel and methods for making and using the fuel. The fuel is a particulate made by drying and comminuting a wet algae. The fuel includes multi-cellular spherical particles of algae. The size and morphology of the particles allows the fuel to be fluidized in a gas stream (e.g., air). In one embodiment, the fluidized algae-based fuel can be combusted in a gas turbine. The algae-based fuels can be used as a propellant (e.g., jet fuel) or used to fire a turbine to generate electricity. The algae-based fuels of the present invention avoid expensive and energy intensive processes needed to extract the lipids and instead utilize the proteins and carbohydrates in the algae as a source of caloric energy. The unique properties of the algae-based fuels prepared according to the methods described herein allows the fuels to be fluidized and efficiently combusted while producing minimal combustion residue.

In one embodiment, a method for making a fluidizable algae-based powdered fuel includes providing a slurry including water and algae. The slurry is dried at a temperature greater than about 70° F. to produce a powdered composition with a moisture content in a range from about 3% to about 18% by weight. The powdered composition is then comminuted to produce a powdered fuel having at least 80% by volume of the particles with a particle size in a range from about 1 micron to about 150 microns. The drying and comminuting yields a fluidizable powdered fuel.

In one embodiment a fluidizable algae-based powdered fuel include a dry powdered algae having a moisture content in a range from about 3% to about 18% and having at least 80 wt % of the particles in a size range from about 1 micron to about 150 microns. The particles are spheroidal in shape and are comprised of multiple algae cells. In one embodiment, the powdered fuel may have a Hausner ratio less than about 1.4. A Hausner ratio of less than 1.4 may be provided by drying a slurry of algae without rupturing the algae cell wall and avoiding carmelization of carbohydrates in the cells. Selecting the proper conditions for drying can lead to generally spheroidal (i.e., globular or generally sphere-like) particles and and/or particles with a generally homogenous mixture of lipids and carbohydrates within the particles and/or cells. Proper drying in combination with proper particle size may produce a powdered algae-based fuel that can be fluidized in a gas stream.

The powdered fuels of the invention can be entrained in air in sufficient concentrations to be used as a fuel in a gas-turbine engine. The fluidizable characteristics of the algae-based fuels of the present invention are in contrast to lyophilized or "freeze-dried" algae, which are not readily entrained in a gas carrier, but instead cake when exposed to a stream of air, natural gas, propane, and/or nitrogen.

In another embodiment, the present invention relates to methods of using the powdered algae-based fuels in a gas powered turbine. The methods include providing a gas turbine and a powdered fuel derived from algae. The powdered fuel is fluidized in a carrier stream and combusted in the gas turbine. The gas turbine may be configured to drive an electric generator or alternatively to propel an aircraft. The carrier stream may be air and/or methane.

The powdered algae base fuels of the present invention surprisingly produce relatively high heats of combustion even where the lipid concentration is low. The fuels are particularly advantageous for their use in gas turbines because of the low residuals left after combustion. Burning the powdered fuels of the invention produces little or no soot or unburned carbon, which results in high heats of combustion and efficient energy output. The algae-based fuels are also non-abrasive, which results in low wear and tear on turbine blades. Moreover, the combustion of the entire algae cell avoids the costly and complex process of extracting the lipid fraction. The algae based powdered fuels yield sufficient caloric output from a given quantity of algae biomass with sufficiently low processing costs so as to be cost competitive with traditional fossil fuels. This is particularly evident where the algae-based powdered fuels are manufactured from waste algae or nuisance algae having a negative value (i.e., algae with disposal costs or mitigation costs). Consequently, the algae-derived powdered fuels pose a potentially viable source of renewable energy to compete with traditional fossil fuels, which could lead to reduced carbon emissions and reduced impact on the environment. The carbon footprint of the system may be further reduced by using the carbon dioxide emissions from a coal fired electric generation plant to grow the algae used to make the powdered fuels described herein.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Definitions

The present invention relates to powdered algae derived fuels that have desired properties for fluidizing the fuel any carrier stream such as air. It has been found that the algae-based powdered fuels described herein can have particles that are more regular and spherical than algae powders prepared by traditional means such as by lyophilization. As used herein, "spheroidal" includes spherical, approximately spherical, round, approximately round, rounded, ball shaped, clump shaped, globular, orbicular, and/or similar shapes.

The particle size of perfectly spherical particles is measured by the diameter. While the algae particles of the fuels of the present invention may be generally spherical, the particles do not necessarily form perfect spheres. Thus, the "particle size" shall be determined according to accepted methods for determining the particle size of ground or other otherwise non spherical materials that exhibit a spheroidal shape. The size of particles in a sample can be measured by visual estimation or by the use of a set of sieves. Particle size can be measured individually by optical or electron microscope analysis. The particle size distribution (PSD) can also be determined or estimated by laser diffraction (XRD) in a manner customary in the art.

In one embodiment, the powdered fuels of the present invention have desired flowability properties. The flowability of a solid can be described according to the Hausner ratio, which is defined according to Formula (I):

$$H = \rho_T / \rho_B$$ Formula (I)

where $\rho_B$ is the freely settled bulk density of the powder, and $\rho_T$ is the tapped bulk density of the powder. Those skilled in the art are familiar with the apparatus and techniques used to calculate a Hausner ratio of a powdered material.

Except as otherwise specified, percentages are to be understood in terms of weight percent.

II. Methods for Making Fluidizable Algae-Based Powders

Figure 1:
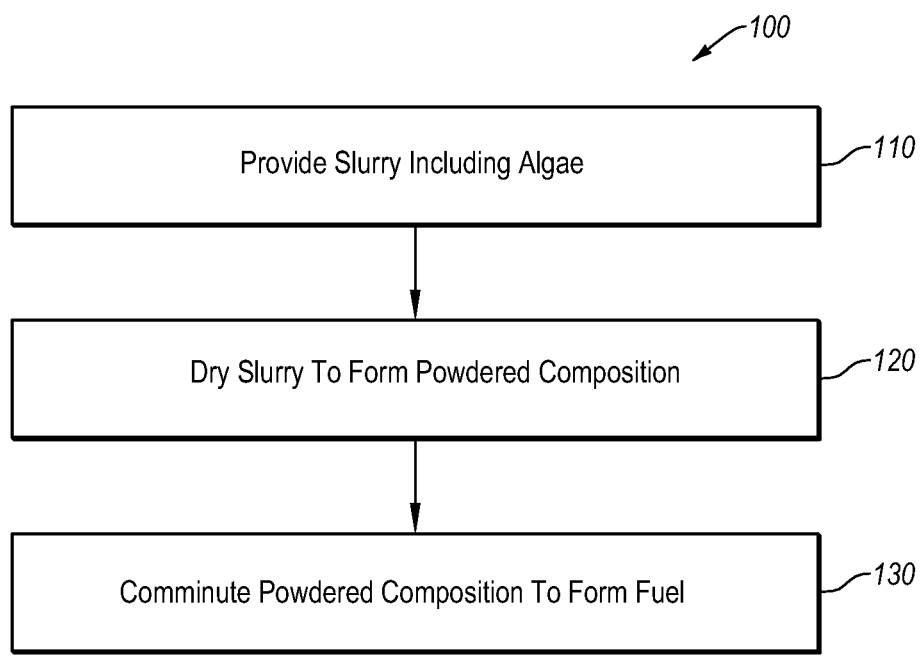
FIG. 1 is a flow diagram illustrating steps for manufacturing a fluidizable algae-based powdered fuel.

FIG. 1 illustrates a flow diagram showing an example method 100 for making a fluidizable algae-based powdered fuel. In step 110 a slurry including algae is provided. In step 120 the slurry is dried to produce a powdered composition. In step 130 the powdered composition is comminuted to produce a fluidizable powdered fuel.

The algae may be provided as a slurry of algae and water. The slurry may include greater than 20% water and typically includes about 20 wt % to about 30 wt % water, although slurries with higher or lower water content may be provided.

In some embodiments it may be beneficial to provide a slurry with a relatively low salt concentration. Slurries prepared from algae from fresh water lakes and rivers typically have a low salt concentration. Notwithstanding the foregoing, slurries with high salt concentrations may be used and/or may optionally be processed to remove all or a portion of the salts. In one embodiment, the liquid component of the slurry may have a salt concentration of less than 40 parts per thousand (ppt), preferably less than 20 ppt, even more preferably less than about 1 ppt, and most preferably less than about 0.5 ppt. Minimizing the salt concentration can facilitate proper drying of the slurry to produce a fludiziable powder and/or minimize the residual material present after combustion of the powdered fuel.

The type of algae is selected for its ability to produce multi-cellular algae particles that have a desired size and morphology for being fluidized and a desired composition for being combusted. In one embodiment, the individual algae cells that make up the multi-cellular particles may be a few microns in diameter to tens of microns in diameter. The algae cells may include lipids (e.g., fatty acids), carbohydrates (e.g., sugars), and/or proteins. In one embodiment the lipid content in the algae may be in a range from 1 wt % to about 55 wt %, preferably in a range from about 1.5 wt % to about 40 wt % and most preferably from about 2 wt % to about 30 wt %. In some embodiments, it may be desirable to use algae with a lipid content in a range from 1 wt % to about 10 wt %.

The algae may be naturally occurring algae, cultivated algae, and/or bioengineered algae. The use of naturally occurring algae can be advantageous because of its ability to compete with other algae or organisms in a natural environment, thereby avoiding contamination. However, cultured algae and/or bioengineered algae can be advantageous in cases where the cultivation or engineering produces a algae with desired properties (e.g., a desired lipid or carbohydrate composition). Examples of suitable strains of algae that can be used in some or all of the methods of the invention include, but are not limited to blue green algae, including food grade algae, camelina, *Botryococcus braunii*, *Dunaliella tertiolecta*, *Nannochloris*, *Chlorophyceae*, and *Chlorella*.

The slurry of algae is typically provided as an aqueous slurry. The use of water to make the slurry is typically convenient since most algae naturally grow in water. However other solvents may be used alone or in combination with water to form a slurry.

The slurry may be used as provided or concentrated before drying. Suitable steps for concentrating the algae before drying include, but are no limited, pressing or mechanical sieving.

In step 120, the slurry is dried to produce a powder composition. The drying is carried out to produce a powder composition with a moisture content in a range from about 3 wt % to about 18 wt %, preferably about 4 wt % to about 12 wt %, even more preferably about 5 wt % to about 10 wt %. The drying is carried out at a temperature and rate of drying that forms multi-celled spheroidal particles. In general, the drying may be carried out at a temperature at or above room temperature and below the initial carmelization temperature of carbohydrates present in the algae. In one embodiment, the temperature may be greater than about 70° F., great than about 80° F., or greater than about 90° F. and less than 160° F., less than 145° F., less than 135° F., or less than 125° F. In some embodiments, the drying temperature may be in a range from about 70° F. to about 145° F., preferably in a range from about 80° F. to about 135° F. While the air temperature used to dry the algae may be within the foregoing ranges, those skilled in the art will recognize that due to heat transfer away from the cells, the internal temperature of the algae may be less than the drying temperature.

The duration of the drying will typically depend on the pressure and ambient humidity and type of drying. Drying can be carried out for at least 30 seconds, at least 1 minute, at least 30 minutes, at least 1 hour, or longer. The duration of the drying may be less than 1 day, preferably less than 1 hour, more preferably less than 30 minutes, most preferably less than 10 minutes.

Any device may be used to dry the algae so long as drying can be carried out within the desired time and temperature parameters. The drying step can include drying in ambient air and/or in direct sunlight. In preferred embodiments, the algae is dried in an spray dryer and/or a drum dryer. In some embodiments, heat source such as a combusted fuel or a heating element is used to apply heat to increase the drying temperature and accelerate the rate of drying.

Figure 2:
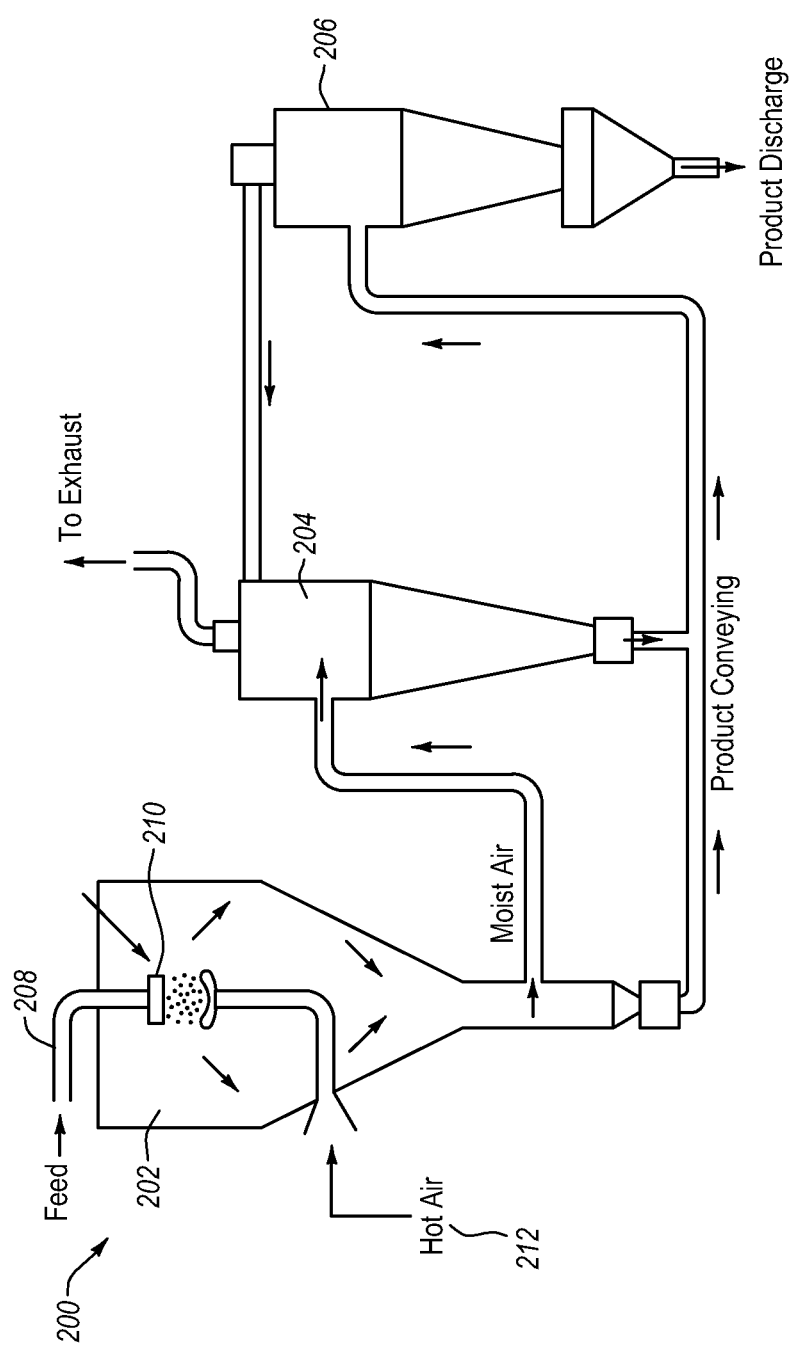
FIG. 2 is a schematic drawings of a dryer.

FIG. 2 illustrates a dryer system 200. Dryer system 200 includes an example spray dryer that may be used to dry an algae slurry according to the methods described herein. FIG. 2 shows a drying chamber 202 where drying is carried out; a cyclone separator 204 for separating algae particles from moisture laden air and a bagging cyclone for separating air from final product. A slurry feed 208 can be introduced into chamber 202 through atomizer 210 and sprayed using hot air that is injected into the atomized feed. Dried product is drawn from chamber 202 and conveyed to bagging cyclone 206. Moist air is delivered to cyclone separator 204 to separate algae particles from moist air. The moist air is expelled from system 200 and product recovered in cyclone 204 may be delivered to bagging cyclone 206. Air flow from bagging cyclone 206 is delivered to cyclone separator 204 for additional separation. The powder composition produced in system 200 is collected and discharged for deliver to a comminution apparatus. While FIG. 2 illustrates a particular spray drying system, those skilled in the art will recognize that other spray dryers and other types of dryers may be used to achieve the desired moisture content.

The powder composition produced from drying is typically an intermediate composition that has a desired water content but typically includes multi-cellular particles with a greater than desired particle size. Surprisingly, the particles may be comminuted to produce a reduced size particulate without destroying the spheroidal shape and smooth surface of the particles. Comminution may be carried out in any device suitable for reducing the particle size of the multi-celled algae particles so long as the cells are not ruptured. Examples of suitable comminution apparatuses include, but are not limited to a high shear grinder, a hammer mill, a mortar and pestle, a blender, a grain mill, a water wheel mill, a turbo mill, a pin mill, or a combination thereof.

Comminution may be performed to obtain particles with an average diameter in a range from about 1 micron to about 150 microns. In one embodiment at least about 70%, 80%, 90%, or 95% by weight of the particles have a particle size in a range from about 1 micron to about 150 microns, more preferably about 20 microns to about 10 microns, even more preferably about 30 microns to about 80 microns. In one embodiment the d10 of the distribution of particles is at least about 1 micron, 5 microns, 10 microns or 20 microns and the d90 of the distribution of particles is less than about 150 microns, 120 microns, 90 microns, or 70 microns. The median particle size may be in a range from about 5 microns to about 100 microns, about 10 microns to about 90 microns, or about 20 microns to about 80 microns.

The drying and comminuting are carried out so as to yield a fluidizable powdered fuel. The fluidization can be achieved by selecting the drying temperature, drying rate, moisture content, and algae composition as described above. In one embodiment, the drying temperature and rate, and moisture content result in the organelles of the cells being ruptured without rupturing the cell wall of the algae. The process of the invention may disperse the lipids homogenously through the particles and/or individual cells, which can result in more complete combustion of the carbohydrates and proteins when entrained and combusted in a carrier gas.

The final powdered fuel can be hermetically sealed to ensure that the moisture content remains the same over time or the powdered fuel may be combusted soon after drying (e.g., within days or hours) to avoid changes in moisture content caused by adsorption from ambient air. In one embodiment, the fuel may include an anticaking agent to reduce agglomeration and assure complete combustion of the material.

III. Algae-Based Powdered Fuels

The present invention also includes an algae-based powdered fuel. The powdered fuel includes a powdered algae including at least about 80% by weight of particles in a size range from about 1 micron to about 150 microns and having a moisture content in a range from about 3% to about 18%, wherein a majority of the particles are multicellular and spheroidal. The particle size, composition, morphology, and moisture content of the particles may give the particles the property of being fluidizable in a gas stream. In one embodiment, the fluidizable algae-based powdered fuel has a Hausner ratio less than about 1.4 and preferably in a range from about 1.25 to about 1.4.

The fluidizable algae-based powdered fuel may have a moisture content and/or particle size similar to those described above with respect to the steps of drying and comminuting. Specifically, the fluidizable algae-based powdered fuel may have a moisture content in a range from about 3 wt % to about 18 wt %, preferably about 4 wt % to about 12 wt %, even more preferably about 5 wt % to about 10 wt %. In a preferred embodiment, the moisture content is not less than 1 wt %, preferably not less than 2 wt % to avoid damaging the structure of the multicellular particles. In one embodiment the upper range of the moisture content does not exceed 18 wt %, more specifically 15 wt % and even more specifically 12 wt % so as to avoid excess cohesion and/or agglomeration of the particles, which can lead to poor fluidization of the powder.

The particles tend to have a distribution of particle sizes. In one embodiment, the powdered fuel includes a distribution of particles where at least about 70%, 80%, 90%, or 95% by weight of the particles have a particle size in a range from about 1 micron to about 150 microns, more preferably about 20 microns to about 10 microns, even more preferably about 30 microns to about 80 microns. In one embodiment the d10 of the distribution of particles in at least about 1 micron, 5 microns, 10 microns or 20 microns and the d90 of the distribution of particles is less than about 150 microns, 120 microns, 90 microns, or 70 microns. The median particle size may be in a range from about 5 microns to about 100 microns, about 10 microns to about 90 microns, or about 20 microns to about 80 microns.

The particles of the fluidizable algae-based powdered fuels may be mostly comprised of intact algae cells and substantially free of cellular debris or other remnants of ruptured algae cells. In one embodiment, at least about 80%, preferably at least about 90%, more preferably at least about 95%, and most preferably at least about 99% by weight of the algae in the powdered fuel is whole cells.

The fluidizable algae-based powdered fuel may have a relatively high heat of combustion. In one embodiment the heat of combustion is at least 20 kJ/g, more preferably at least about 25 kJ/g, and most preferably at least about 30 kJ/g. In one embodiment, the powdered fuel can be a jet fuel suitable for powering an aircraft. One advantage of using the powdered fuel of the invention as a jet fuel as that it is not susceptible to gelling, which can be problematic for jets flying in cold air at high elevations.

Surprisingly, the fluidizable algae-based powdered fuels can have a relatively high heat of combustion even where the lipid content is relatively low (e.g., less than 5% or even less than 2%). The multicellular particles tend to provide evenly distributed lipids and/or carbohydrate with a desirably high surface area, which allows complete combustion of carbohydrates, lipids, and proteins, as compared to other types of powdered algae. The fluidizable algae-based powdered fuels may also be relatively light weight as compared to liquid fuels.

The powdered fuels may be stored in an airtight container or a humidity controlled atmosphere to maintain a desired moisture content until the fuel is ready to be used.

IV. Methods for Using Algae-Based Powdered Fuels

Figure 3:
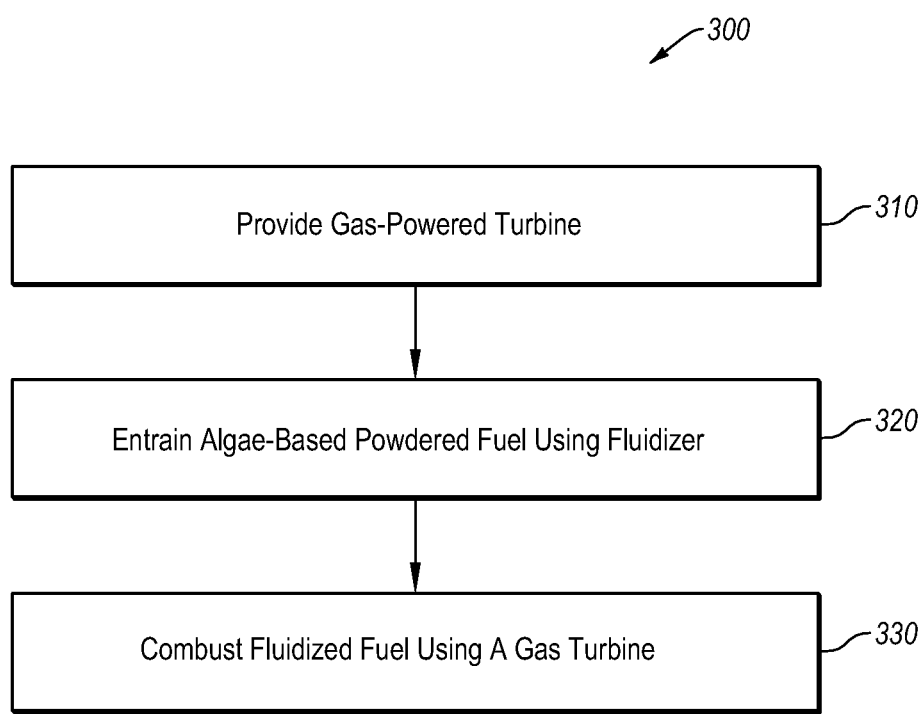
FIG. 3 is a flow diagram showing steps for using a fluidized powdered fuel in a gas turbine.

The powdered fuel of the present invention may be used in a gas powered turbine. FIG. 3 is a flow diagram illustrating the use of the powdered fuels of the present invention in a gas powered turbine. A method 300 may include step 310, which includes providing a gas powered turbine. In step 320, an algae-based powdered fuel is entrained in an airstream using a fluidizer. In step 330, the entrained fuel is combusted in a gas turbine.

Figure 4:
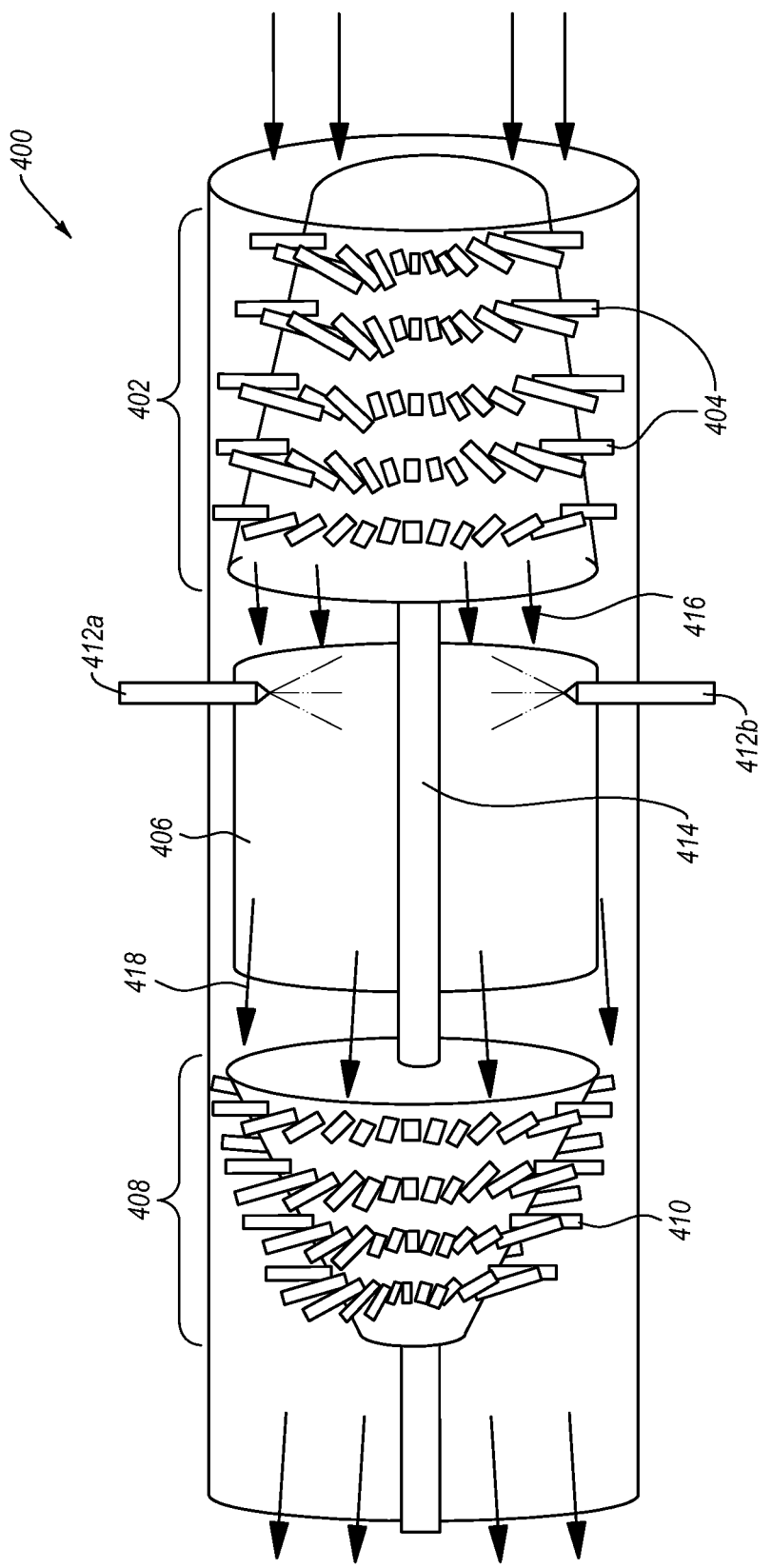
FIG. 4 is a schematic drawing of a turbine.

The powdered fuel of the present invention can be combusted in any gas turbine configured to receive a powdered fuel. FIG. 4 illustrates a simplified diagram of a gas turbine 400 suitable for use in the methods described herein. Turbine 400 includes a compressor section 402 having fan blades 404 configured to compress air and inject the compressed air into combustion chamber 406. A turbine section 408 is connected to compressor section 402 via a rotating axle 414. Turbine section 408 has turbine blades 410 configured to drive turbine 408 as gases combusted in chamber 406 pass over turbine blades 410 and exit turbine 400. Combustion chamber 406 also includes a plurality of fuel injectors 412 (412*a* and 412*b*) configured to spray an entrained powdered fuel into combustion chamber 406 where it combines with compressed air from compressor section 402 and burns to produce heat and expand the gasses, thereby forcing air 418 over turbine blades 410 to turn turbine section 408, which also rotates compressor section 402. Hot gasses exiting turbine section 408 provide propulsion or drive an electrical generator mechanically coupled to rotating axle 414.

The powdered fuel can be ignited using an ignition source such as propane and/or methane gas. The ignition can be initiated using an electrical igniter, a magneto igniter, or the like.

To inject the powdered fuel into chamber 406 the fuel is entrained in a gas stream using a fluidizer. The fluidizer can include mechanical fluidizers, nozzles, pumps and/or other equipment known for use in fluidizing a solid powder. The flow rate of the injected powder may be continuous. Variable, and/or turbulent. Those skilled in the art are familiar with devices for fluidizing powders. In one embodiment, the fluidizer can be a tube coupled to a source of compressed air that provides a stream of air at a flow rate that can suspend the particles of the powdered fuel. The carrier may be air and/or a gaseous fuel such as methane. Combining the powdered fuel with a gaseous fuel can facilitate complete combustion of the powdered fuel component.

The powdered fuel of the present invention may be used in a gas turbine incorporated into an aircraft such as a jet. The light weight of the fuel and complete burn can be advantageous for use with jet aircraft.

In an alternative embodiment, the powdered fuel may be used for power generation system. Combustion of the powdered fuel is used to drive a gas turbine, which in turn drives an electric generator to produce electrical power. The electrical power may be distributed to a grid, such as a public or private power grid.

In one embodiment, power generation can be performed in combination with drying the algae slurry to increase the efficiency of the overall system. In this embodiment, waste heat from the combustion of the powdered fuel is delivered to a dryer (e.g., dryer 200) and used to dry the algae slurry.

The use of the powdered fuels of the invention to drive a turbine can be highly economical due to the nearly complete combustion of all the organics present in the algae. By utilizing the caloric value of the carbohydrates, proteins, and lipids in the algae, the present invention can produce green power at a much lower cost and much higher efficiency compared to biofuel methods that extract and process just the lipid fraction of an algae biomass.

V. Examples

The following examples illustrate example methods for making antimicrobial coated devices and using the devices.

Example 1

Example 1 teaches a method for making a fluidizable algae-based powdered fuel. A Blue Green algae harvested from a fresh water lake (Klamath Lake, Oreg., USA) was provided as a frozen 200 lb block of an algae slurry with a moisture content of 20 wt %. The block was stored at 29° F. until use. The frozen block was thawed in a controlled atmosphere room at 50 degrees F. until the aqueous component had thawed completely.

The algae slurry was then conveyed in a pipe to a tank of a 30" BOWEN TOWER SPRAY DRYER, S/S (Stainless Steel). The sprayer dryer was preheated to 160° F. The algae slurry was then dried for 2 minutes in the spray dryer at the rate of 1000 lbs per hour to produce a powered composition with an average moisture content of 8%. The particle size of the powered composition ranged from about 80 microns to 300 microns.

The powered composition was fed via screw conveyor directly to a finishing mill for processing in a Hammer Mill-10 (made by MillCo) to produce a powdered fuel with an average particle size of 50 microns. A single run produced greater than 100 kg of fuel. The finished product was conveyed into plastic lined boxes for transportation.

Figure 5:
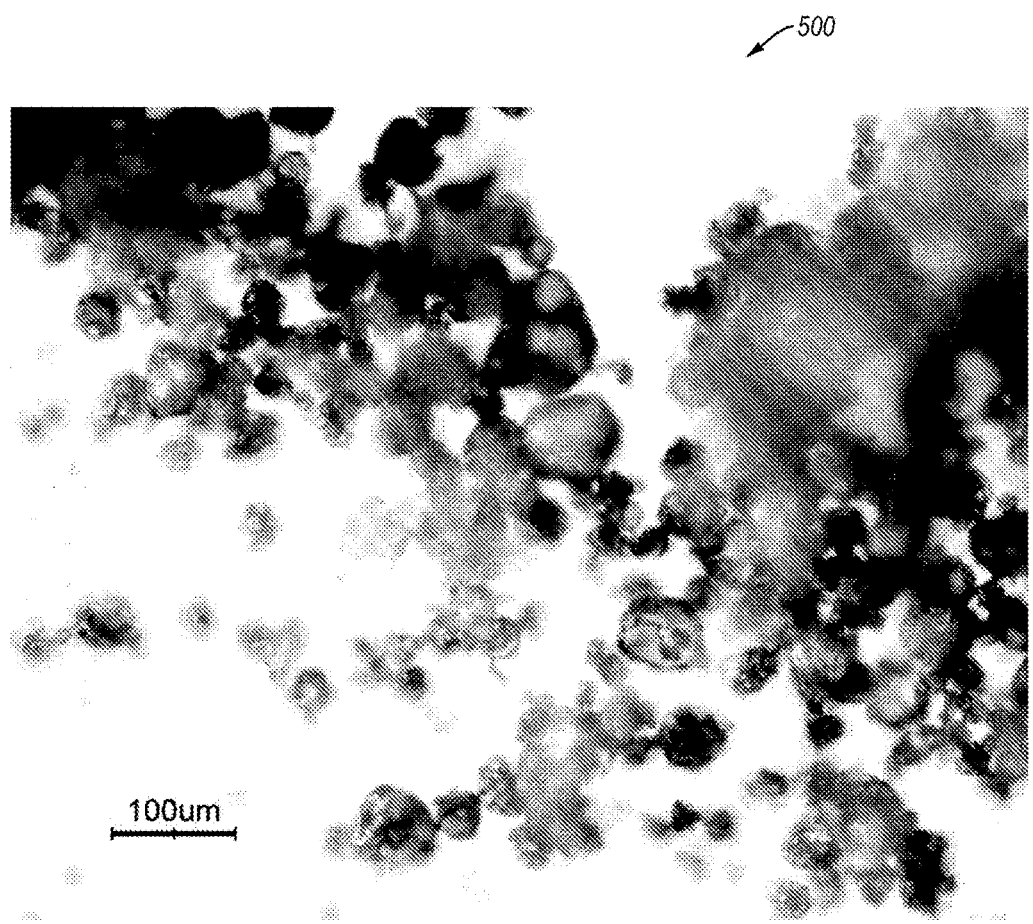
FIG. 5 is in micrograph of the powdered fuel manufactured according to Example 1.
Figure 6:
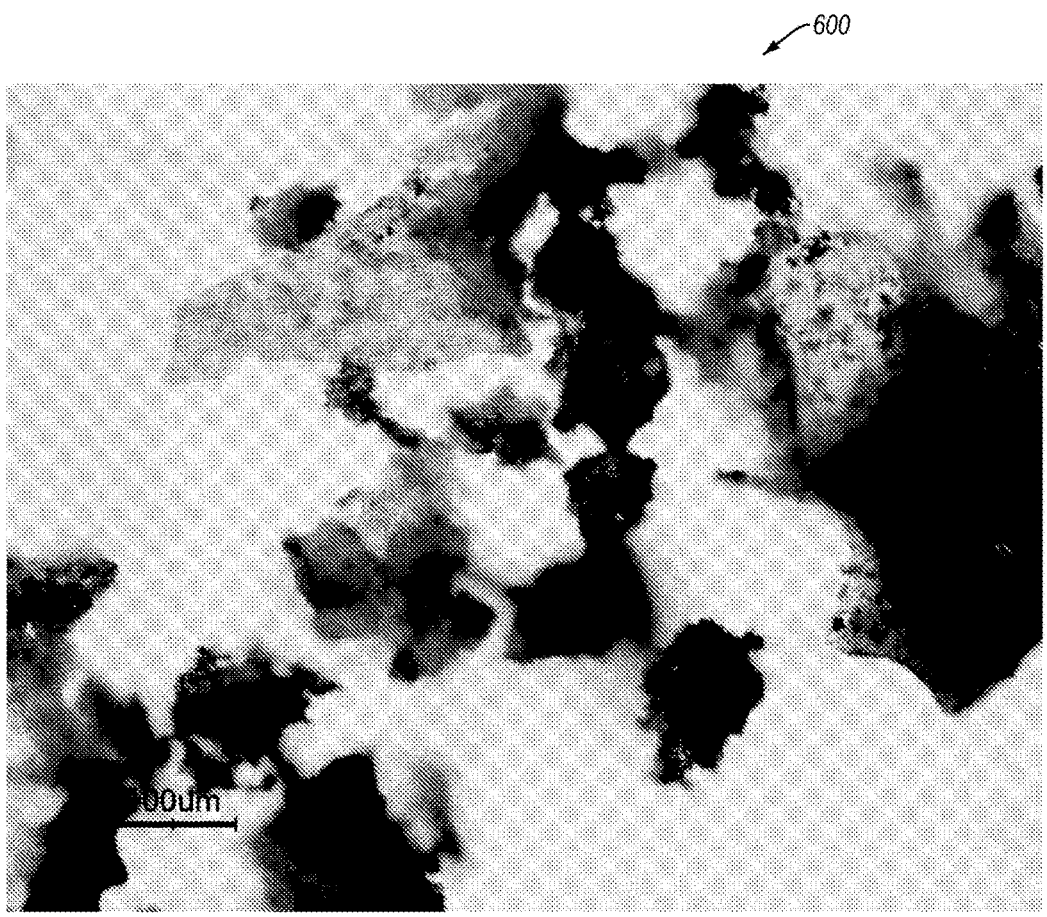
FIG. 6 is a micrograph of a powdered fuel manufactured by lyophilizing and is provided for comparison to FIG. 5.

FIG. 5 is a micrograph showing particles manufactured according to Example 1. FIG. 6 is a micrograph showing a comparative powdered algae prepared using lyophilization. As can be seen in the comparison between FIG. 5 and FIG. 6, the powdered fuel manufactured according to the present invention (i.e., FIG. 5) has particles that are spheroidal in shape and generally smooth surfaces whereas the lyophilized algae exhibits irregular shapes and broken cells. When placed in water, the particles of the powder produced in Example 1 slowly absorbed water and eventually popped (i.e., the particles are water swellable and rupturable). In contrast, the particles of the comparative lyophilized sample shown in FIG. 6 did not swell and pop, thereby illustrating the distinct configuration of the cells in the particle of Example 1 as compared to methods prepared by the traditional method of lyophilization.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for making an algae-based powdered fuel that is free flowing and does not require a liquid carrier, comprising:
   providing a slurry comprising water and algae;
   drying the slurry to produce a powder composition with a moisture content in a range from about 3% to about 18% by weight, wherein the drying to produce the powder composition is carried out at a temperature greater than 70° F.;
   comminuting the powder composition to produce a powdered fuel having at least 80% by volume of the particles with a particle size in a range from about 1 micron to about 150 microns, wherein a majority of the particles are multicellular and spheroidal whole algal cells comprised of lipids, carbohydrates, and proteins; and wherein the drying and comminuting yields a fluidizable powdered fuel.

2. A method as in claim 1, wherein the algae includes proteins, carbohydrates, and at least about 1 wt % lipids and wherein the drying is carried out at a temperature below the initial carmelization temperature of the carbohydrates.

3. A method as in claim 1, wherein the drying temperature is in a range from about 80° F. to about 140° F.

4. A method as in claim 1, wherein the drying produces the powdered composition with a moisture content in a range from about 4 wt % to about 12 wt %.

5. A method as in claim 1, wherein the median particle size is in a range from about 20 microns to about 90 microns.

6. A method as in claim 1, wherein drying is carried out using a drum dryer, a spray dryer, sunlight, or a combination thereof.

7. A method as in claim 1, wherein the water content of the slurry is reduced using a press or a mechanical sieve.

8. A method as in claim 1, wherein the comminution is carried out using a high shear grinder, a hammer mill, a mortar and pestle, a blender, a grain mill, a water wheel mill, a turbo mill, a pin mill, or a combination thereof.

9. A powdered fuel manufactured according to the method of claim 1 and having a Hausner ratio in a range from about 1.25 to about 1.4.

* * * * *